United States Patent
Ishihara (10) Patent No.: US 9,387,855 B2
(45) Date of Patent: Jul. 12, 2016

(54) VEHICLE CONTROL APPARATUS AND VEHICLE CONTROL METHOD

(71) Applicant: JTEKT CORPORATION, Osaka-shi, Osaka (JP)

(72) Inventor: Atsushi Ishihara, Sakurai (JP)

(73) Assignee: JTEKT CORPORATION, Osaka (JP)

(*) Notice: Subject to any disclaimer, the term of this patent is extended or adjusted under 35 U.S.C. 154(b) by 0 days.

(21) Appl. No.: 14/566,128

(22) Filed: Dec. 10, 2014

(65) Prior Publication Data

US 2015/0166063 A1    Jun. 18, 2015

(30) Foreign Application Priority Data

Dec. 18, 2013   (JP) ................... 2013-261285

(51) Int. Cl.
*B60W 30/14* (2006.01)
*B62D 6/02* (2006.01)
*B62D 15/02* (2006.01)

(52) U.S. Cl.
CPC ............. *B60W 30/14* (2013.01); *B62D 15/025* (2013.01); *B62D 6/02* (2013.01)

(58) Field of Classification Search
None
See application file for complete search history.

(56) References Cited

U.S. PATENT DOCUMENTS

| | | | | |
|---|---|---|---|---|
| 6,282,478 B1* | 8/2001 | Akita | .................. | B60K 31/00 303/125 |
| 2004/0186650 A1* | 9/2004 | Tange | ................. | B60T 8/17557 701/96 |
| 2005/0240334 A1* | 10/2005 | Matsumoto | ........ | B60K 31/0083 701/93 |
| 2010/0191421 A1* | 7/2010 | Nilsson | ................ | B62D 15/025 701/41 |
| 2010/0204897 A1* | 8/2010 | Labuhn | ................. | B60W 30/16 701/93 |
| 2012/0283912 A1* | 11/2012 | Lee | ........................ | B62D 1/286 701/41 |
| 2013/0131925 A1 | 5/2013 | Isaji et al. | | |

FOREIGN PATENT DOCUMENTS

| | | |
|---|---|---|
| EP | 1 602 561 A1 | 12/2005 |
| EP | 2 340 975 A1 | 7/2011 |
| EP | 2 463 178 A1 | 6/2012 |
| JP | A-2004-206275 | 7/2004 |

(Continued)

OTHER PUBLICATIONS

Jul. 27, 2015 Seach Report issued in European Application No. 14197762.9.

(Continued)

*Primary Examiner* — Rami Khatib
*Assistant Examiner* — Timothy Nesley
(74) *Attorney, Agent, or Firm* — Oliff PLC (57) ABSTRACT

A vehicle control apparatus executes automated cruise control under which a steering apparatus is controlled to make a vehicle perform automated cruise. The vehicle control apparatus sets a curvature radius difference threshold used in a process for determining whether to start automated cruise control, based on a transverse deviation of the vehicle. The vehicle control apparatus does not start the automated cruise control when the absolute value of a curvature radius difference is larger than the curvature radius difference threshold. The curvature radius difference is a difference between a travelling path curvature radius and a lane curvature radius, the travelling path curvature radius being a curvature radius of a travelling path of the vehicle and the lane curvature radius being a curvature radius of a lane in which the vehicle is travelling.

11 Claims, 9 Drawing Sheets

(56) References Cited

FOREIGN PATENT DOCUMENTS

| WO | 02/092375 A2 | 11/2002 |
| WO | 2010/038317 A1 | 4/2010 |

OTHER PUBLICATIONS

Jan. 27, 2016 Search Report issued in European Patent Application No. 14197762.9.

* cited by examiner

VEHICLE CONTROL APPARATUS AND VEHICLE CONTROL METHOD

INCORPORATION BY REFERENCE

The disclosure of Japanese Patent Application No. 2013-261285 filed on Dec. 18, 2013 including the specification, drawings and abstract is incorporated herein by reference in its entirety.

BACKGROUND OF THE INVENTION

1. Field of the Invention

The invention relates to a vehicle control apparatus that executes automated cruise control under which a vehicle performs automated cruise, and relates also to a vehicle control method for executing automated cruise control under which a vehicle performs automated cruise.

2. Description of the Related Art

When executing automated cruise control under which a vehicle performs automated cruise, a vehicle control apparatus controls a steering apparatus based on information on, for example, a lane obtained by an in-vehicle camera such that a vehicle travelling path (path along which the vehicle is actually travelling) coincides with a target travelling path.

When the vehicle is travelling under the automated cruise control, a driver has a difficulty in recognizing the future vehicle behavior, unlike in the case where he/she operates a steering member by himself/herself to drive the vehicle. Hence, when the vehicle travelling under the automated cruise control exhibits unstable behavior, the driver is more likely to feel a sense of anxiety, than in the case where he/she operates the steering member by himself/herself.

On the other hand, a vehicle control apparatus described in Japanese Patent Application Publication No. 2004-206275 (JP 2004-206275 A) terminates automated cruise control for making the vehicle travelling path coincide with the target travelling path, when the vehicle control apparatus predicts that the vehicle behavior will become unstable based on the curvature radius of the lane in which the vehicle is travelling and the curvature radius of the vehicle travelling path. Thus, the vehicle travelling under the automated cruise control is less likely to exhibit unstable behavior. This reduces the possibility that the driver will feel a sense of anxiety when the vehicle is travelling under the automated cruise control.

The stability of vehicle behavior is influenced not only by the relationship between the curvature radius of the lane and the curvature radius of the travelling path but also by the factors related to travelling of the vehicle. However, the vehicle control apparatus described in JP 2004-206275 A does not take into account such factors when predicting the vehicle behavior during the automated cruise. Therefore, there is still a possibility that the vehicle provided with the vehicle control apparatus described in JP 2004-206275 A will exhibit unstable behavior when travelling under automated cruise control.

SUMMARY OF THE INVENTION

One object of the invention is to provide a vehicle control apparatus and a vehicle control method that make it possible to reduce the possibility that a vehicle will exhibit unstable behavior when travelling under automated cruise control.

An aspect of the invention relates to a vehicle control method for executing automated cruise control under which a steering apparatus of a vehicle is controlled to make the vehicle perform automated cruise. The method includes: setting a curvature radius difference threshold based on vehicle information that is information regarding travelling of the vehicle, the curvature radius difference threshold being used in a process for determining whether the automated cruise control is to be started; and determining whether an absolute value of a curvature radius difference that is a difference between a travelling path curvature radius and a lane curvature radius is larger than the curvature radius difference threshold, the travelling path curvature radius being a curvature radius of a travelling path of the vehicle and the lane curvature radius being a curvature radius of a lane in which the vehicle is travelling. The automated cruise control is not started when the absolute value is larger than the curvature radius difference threshold.

When the absolute value of the curvature radius difference is large, there is a possibility that the steered angle of the vehicle will be changed by a large amount under the automated cruise control. Hence, if the automated cruise control is started when the absolute value of the curvature radius difference is large, there is a possibility that the vehicle will exhibit unstable behavior after the automated cruise is started. Therefore, according to the vehicle control apparatus in the above aspect, the automated cruise control is not started when the absolute value of the curvature radius difference is larger than the curvature radius threshold. Thus, it is possible to reduce the frequency with which the automated cruise control is started in the state where there is a possibility that the vehicle will exhibit unstable behavior after the automated cruise is started. As a result, the vehicle is less likely to exhibit unstable behavior when travelling under the automated cruise control.

On the other hand, when the steering apparatus changes the steered angle of the vehicle that is travelling under the automated cruise control, the behavior exhibited by the vehicle varies depending on the transverse deviation even if the absolute value of the curvature radius difference is the same. That is, the vehicle travelling under the automated cruise control is more likely to exhibit unstable behavior when the steering angle is changed by the steering apparatus, as the transverse deviation is larger. Therefore, when the behavior of the vehicle is controlled based on the absolute value of the curvature radius difference, the control apparatus sets the curvature radius difference threshold, which is a determination reference with respect to the absolute value of the curvature radius difference, based on the transverse deviation. Thus, the behavior of the vehicle is controlled more appropriately.

Therefore, according to the vehicle control method in the above aspect, the curvature radius difference threshold is set as described above. For example, when the transverse deviation is large, the curvature radius difference threshold is set to a value smaller than that when the transverse deviation is small. Hence, the determination that the absolute value of the curvature radius difference is larger than the curvature radius difference threshold is more likely to be made. When the transverse deviation is large, the automated cruise control is less likely to be started. The vehicle is further less likely to exhibit unstable behavior when travelling under the automated cruise control. Note that, the advantageous effects produced by the vehicle control method have been described using the case where the curvature radius difference threshold is set based on the transverse deviation, which is an example of the vehicle information, as an example. However, the advantageous effects similar to those described above are obtained even when the curvature radius difference threshold is set based on other kinds of vehicle information.

BRIEF DESCRIPTION OF THE DRAWINGS

The foregoing and further features and advantages of the invention will become apparent from the following descrip

DETAILED DESCRIPTION OF EMBODIMENTS

Hereinafter, the configuration of a vehicle control apparatus according to an embodiment of the invention will be described with reference to FIG. 1. A vehicle 1 is provided with a steering apparatus 10, a display unit 20, a switching device 30, a vehicle speed detector 40, a yaw rate detector 50, a CCD camera 60, a lane mark recognizing unit 70 and a control apparatus 80.

The steering apparatus 10 changes the steered angle of the vehicle 1 using an actuator (not illustrated). The display unit 20 presents various kinds of information to a driver. The switching device 30 is a switch that transmits a signal indicating the driver's intention to switch the cruise mode of the vehicle 1 between a manual cruise mode and an automated cruise mode, to the control apparatus 80. The switching device 30 is disposed at such a position that the driver is able to operate the switching device 30. The switching device 30 transmits a switching signal to the control apparatus 80, when the driver performs an operation for switching the cruise mode from the manual cruise mode to the automated cruise mode.

The CCD camera 60 captures an image of a road surface ahead of the vehicle 1. The CCD camera 60 is attached to a front portion of the vehicle 1, at the center position in the width direction of the vehicle 1 (hereinafter, referred to as "vehicle transverse center").

The lane mark recognizing unit 70 recognizes a right lane mark LR and a left lane mark LL of a lane in which the vehicle 1 is travelling, based on the image of the road surface captured by the CCD camera 60. The lane marks LR, LL are division lines of the lane indicated by continuous lines or broken lines. Examples of the lane marks LR, LL include while lines and yellow line. The lane mark recognizing unit 70 computes positional information at multiple positions on each of the lane marks LR, LL, and transmits the positional information, as position signals, to the control apparatus 80 at intervals of a prescribed unit time.

Figure 2:
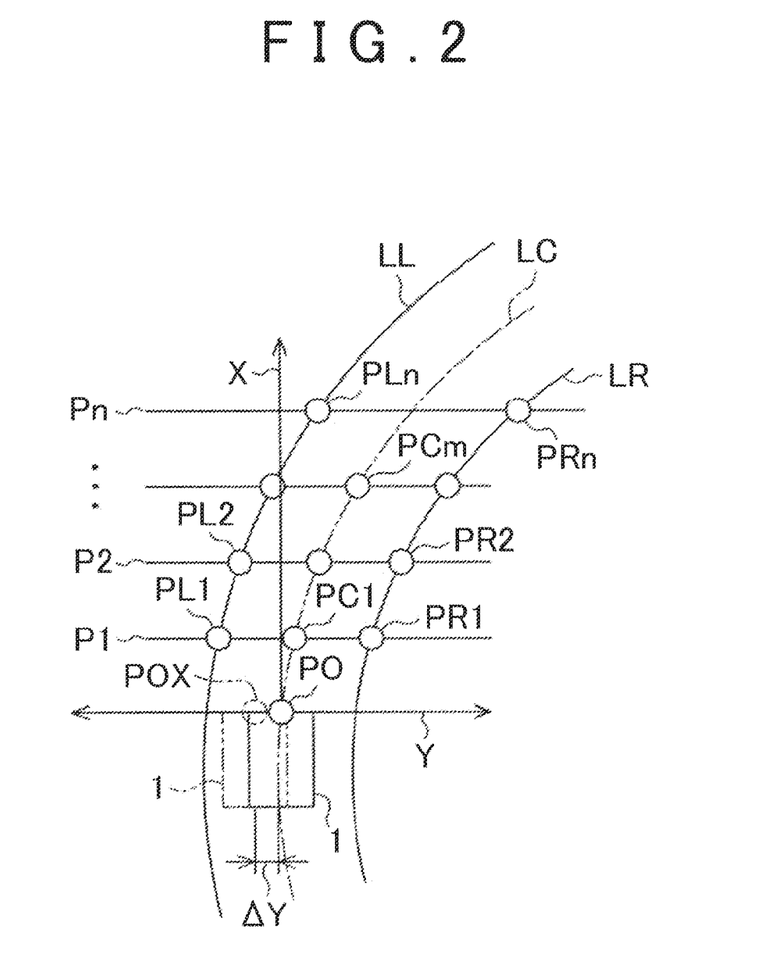
FIG. 2 is a schematic diagram illustrating a method of computing the positional information on lane marks in the first embodiment.

With reference to FIG. 2, a method by which the lane mark recognizing unit 70 computes the positional information will be described. The lane mark recognizing unit 70 sets front positions P1 to Pn on each of the lane marks LR, LL at prescribed intervals, in a region ahead of the vehicle 1 along an axis line X extending in the longitudinal direction of the vehicle 1 from an origin position PO, which is the position of the CCD camera 60 of the vehicle 1. The prescribed interval may be, for example, 10 m.

The lane mark recognizing unit 70 sets positions on the right lane mark LR, which coincide with the front positions P1 to Pn, as right positions PR1 to PRn, and sets positions on the left lane mark LL, which coincide with the front positions P1 to Pn, as left positions PL1 to PLn.

The lane mark recognizing unit 70 computes the positional information on the right positions PR1 to PRn and the left positions PL1 to PLn, as coordinates in a coordinate system defined by a coordinate axis extending in the direction of the axis line X and a coordinate axis extending in a transverse direction Y that is perpendicular to the axis line X.

Figure 1:
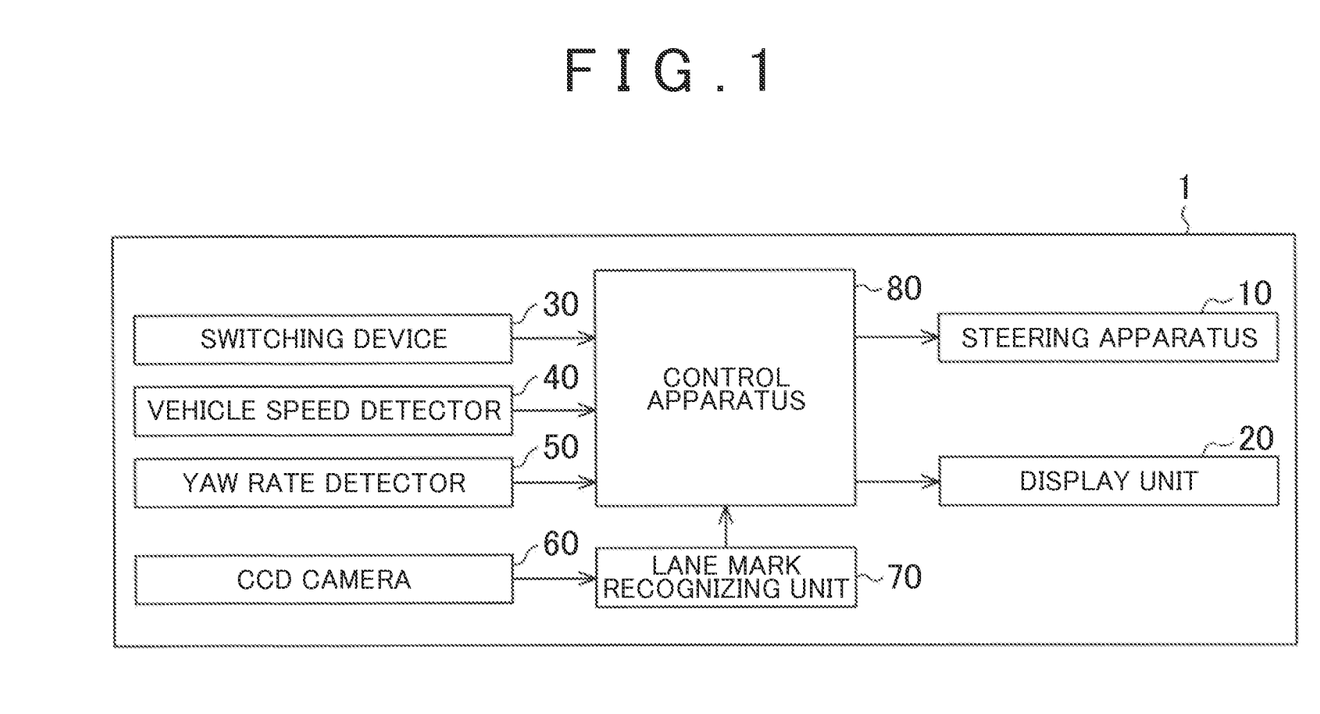
- FIG. 1 is a block diagram illustrating the configuration of a vehicle control apparatus according to a first embodiment of the invention.

With reference to FIG. 1, the configuration of the control apparatus 80 will be described. An output from the vehicle speed detector 40 is input into the control apparatus 80. The control apparatus 80 computes a travelling speed of the vehicle 1 (hereinafter, referred to as "vehicle speed V") based on the output from the vehicle speed detector 40. An output from the yaw rate detector 50 is input into the control apparatus 80. The control apparatus 80 computes a yaw rate of the vehicle 1 (hereinafter referred to as "yaw rate co") based on the output from the yaw rate detector 50. The output from the vehicle speed detector 40 and the output from the yaw rate detector 50 are examples of vehicle information.

The control apparatus 80 executes starting determination control for determining whether the cruise mode of the vehicle 1 is to be switched from the manual cruise mode to the automated cruise mode. In the manual cruise mode, the steering apparatus 10 changes the steered angle based on an operation of a steering wheel (not illustrated) performed by the driver.

In the automated cruise mode, the steering apparatus 10 is subjected to the automated cruise control based on a steering control signal output from the control apparatus 80. In the automated cruise control, the control apparatus 80 controls the steered angle such that the vehicle 1 travels at the center of the lane in its width direction, the center being defined by the lane marks LR, LL (hereinafter referred to as "lane transverse center"). Specifically, the control apparatus 80 computes a target yaw rate for the vehicle 1, computes a target steered angle based on a present yaw rate co and the target yaw rate, and controls the actuator of the steering apparatus 10 based on the target steered angle to change the steered angle.

Figure 3:
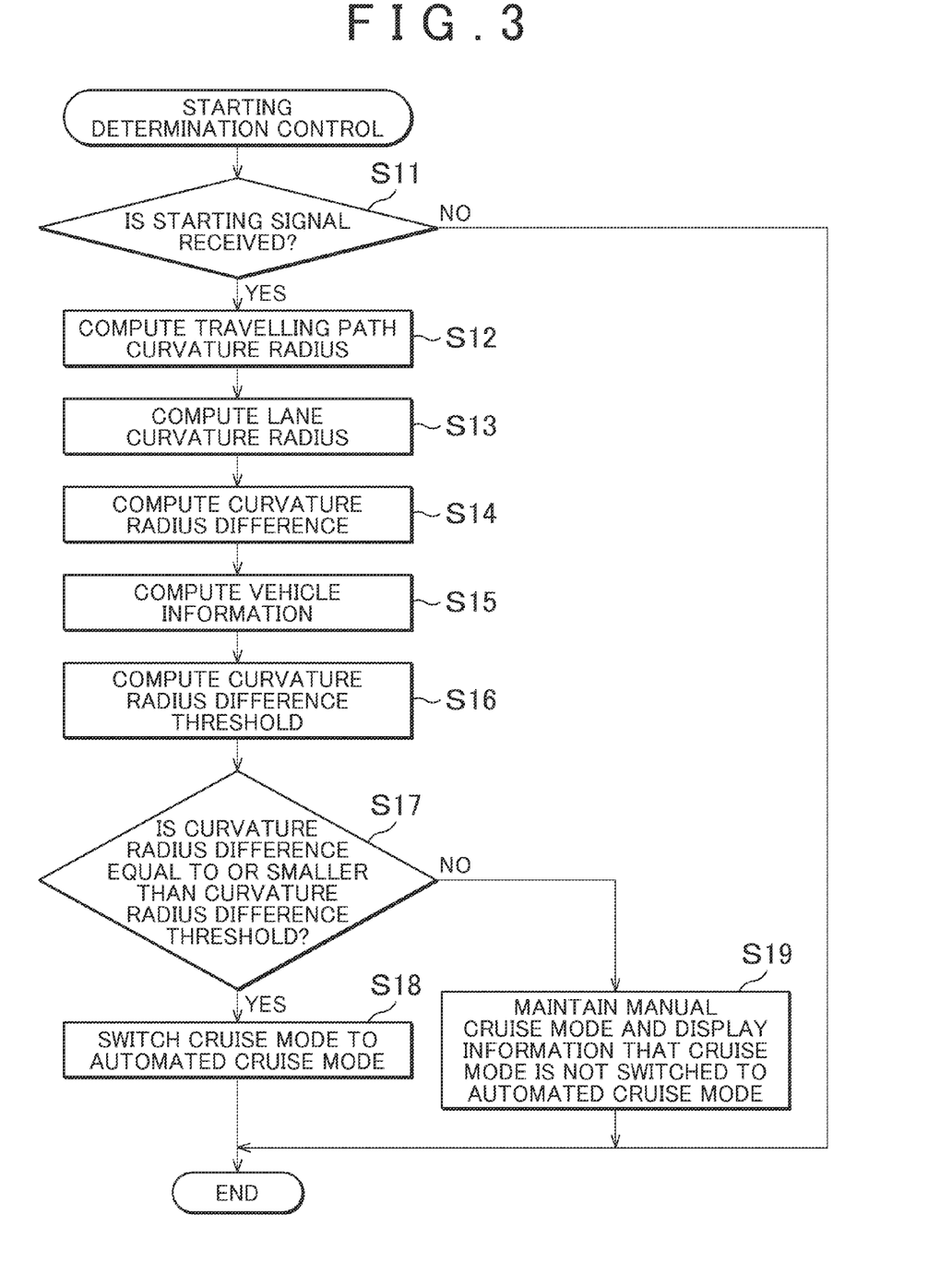
FIG. 3 is a flowchart illustrating the process of starting determination control that is executed by the control apparatus in the first embodiment.

With reference to FIG. 3, the process of the starting determination control executed by the control apparatus 80 will be described. The process is repeatedly executed at prescribed time intervals. The control apparatus 80 determines in step S11 whether a starting signal is received. When a negative determination is made in step S11, that is, when the switch, which serves as the switching device 30, is maintained in a state corresponding to the manual cruise mode, the control apparatus 80 ends the process.

On the other hand, when an affirmative determination is made in step S11, that is, when the switching device 30 is switched from the state corresponding to the manual cruise mode to a state corresponding to the automated cruise mode, the control apparatus 80 executes computation processes in step S12 to step S16 described below.

In step S12, the control apparatus 80 computes a curvature radius of a travelling path along which the vehicle 1 is actually travelling (hereinafter referred to as "travelling path curvature radius RA") based on the yaw rate co and the vehicle speed V. Because the yaw rate co is correlated with an amount of change in the steered angle of the vehicle 1, the travelling path curvature radius RA computed based on the yaw rate co reflects the travelling path along which the vehicle 1 has travelled.

In step S13, the control apparatus 80 computes a curvature radius of the lane ahead of the vehicle 1 (hereinafter referred to as "lane curvature radius RB"). In step S14, the control apparatus 80 computes a difference between the travelling path curvature radius RA and the lane curvature radius RB (hereinafter referred to as "curvature radius difference DR").

In step S15, the control apparatus 80 computes a deviation of the vehicle transverse center with respect to the lane transverse center (hereinafter, referred to as "transverse deviation $\Delta Y$") as the vehicle information on the lane and the vehicle 1. In step S16, the control apparatus 80 computes a threshold DX for the curvature radius difference (hereinafter, referred to as "curvature radius difference threshold DX"). The curvature radius difference threshold DX is set according to the transverse deviation $\Delta Y$. The curvature radius difference threshold DX becomes smaller as the transverse deviation $\Delta Y$ becomes larger, and becomes larger as the transverse deviation $\Delta Y$ becomes smaller.

In step S17, the control apparatus 80 determines whether the curvature radius difference DR is equal to or smaller than the curvature radius difference threshold DX. When an affirmative determination is made in step S17, the control apparatus 80 switches the cruise mode to the automated cruise mode in step S18.

When a negative determination is made in step S17, the control apparatus 80 maintains the manual cruise mode and displays the information that the cruise mode is not switched to the automated cruise mode on the display unit 20 in step S19. Then, the control apparatus 80 ends the process. That is, when the curvature radius difference DR is larger than the curvature radius difference threshold DX, the automated cruise is not started.

An example of a method of computing the travelling path curvature radius RA will be described below. The control apparatus 80 determines a present yaw rate co and a present vehicle speed V. Then, the control apparatus 80 computes the curvature radius RA of the travelling path of the vehicle 1 according to Expression (1) below. Whether the sign of the yaw rate co is positive or negative varies depending on whether the vehicle 1 is turning to the right or turning to the left. Therefore, whether the sign of the curvature radius RA is positive or negative varies depending on whether the vehicle 1 is turning to the right or turning to the left.

$$RA = V/\omega \tag{1}$$

With reference to FIG. 2, an example of a method of computing the lane curvature radius RB will be described below. The control apparatus 80 acquires coordinates of each of the right positions PR1 to PRm and coordinates of each of the left positions PL1 to PLm out of the present positional information received from the lane mark recognizing unit 70 (the relationship n m is satisfied). The control apparatus 80 computes the center positions PC1 to PCm between the right positions PR1 to PRm and the left positions PL1 to PLm, which are located at the front positions P1 to Pm, respectively. The control apparatus 80 analyzes coordinates (PCY, PCX) of each of the center positions PC1 to PCm according to the least-square method to obtain Expression (2) below, which is an approximate expression as a function representing a circle based on the coordinates (PCY, PCX). Then, a constant "RB" representing a radius in Expression (2) is determined as the lane curvature radius RB.

$$RB = \{(PCY-a)^2 + (PCX-b)^2\}^{1/2} \tag{2}$$

The curvature radius difference DR is obtained according to Expression (3) below.

$$DR = |RA| - RB \tag{3}$$

An example of a method of computing the transverse deviation $\Delta Y$ will be described below. For example, the vehicle transverse center of the vehicle 1 indicated by a two-dot chain line in FIG. 2 is off leftward with respect to the center line LC of the lane. The position of the CCD camera 60 of the vehicle 1 indicated by the two-dot chain line is located at an offset position POX that is offset leftward from the origin position PO based on the transverse deviation $\Delta Y$. The control apparatus 80 computes a difference between the absolute value of the Y-coordinate of the right position PR1 with respect to the origin position PO and the absolute value of the Y-coordinate of the left position PL1 with respect to the origin position PO, as the transverse deviation $\Delta Y$. When the lane ahead of the vehicle 1 is curved, the computed transverse deviation $\Delta Y$ differs from the actual offset amount. Hence, the transverse deviation $\Delta Y$ may be corrected based on the lane curvature radius RB.

Figure 4:
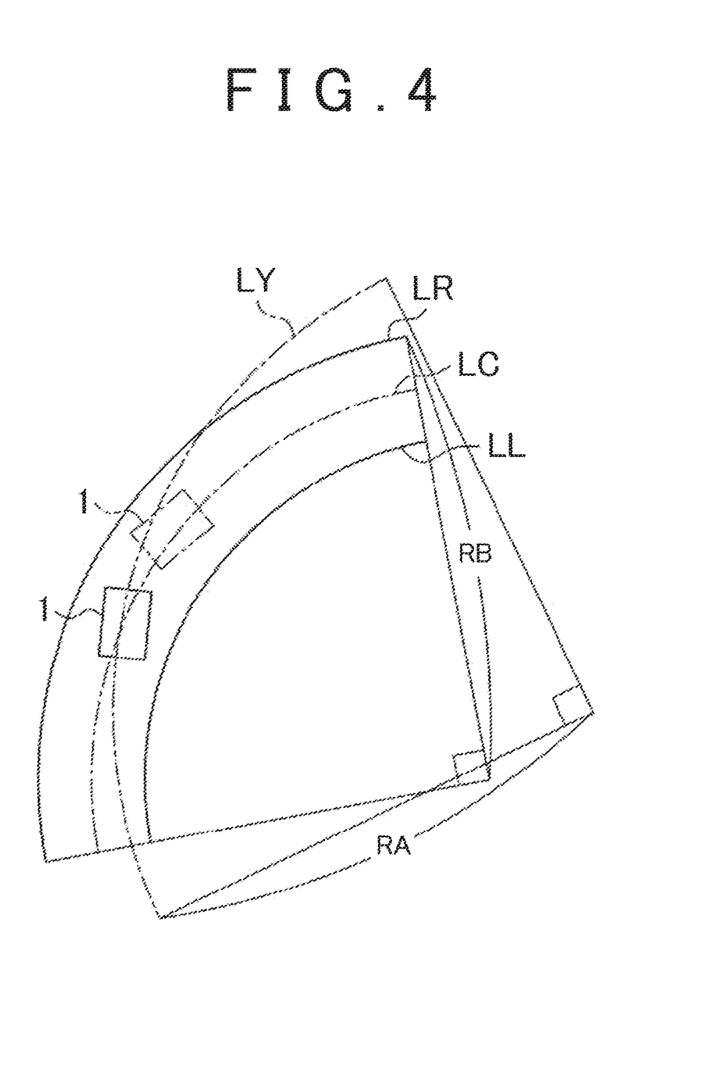
FIG. 4 is a schematic diagram illustrating the relationship between the travelling path and the center line when the travelling path curvature radius differs from the lane curvature radius.
Figure 5A:
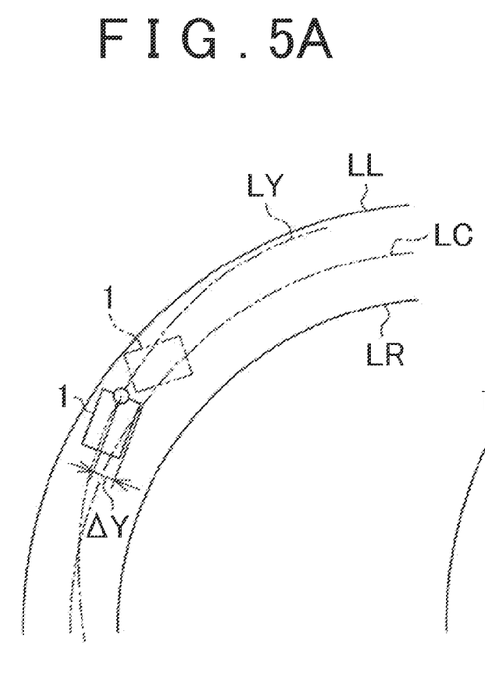
FIG. 5A is a motion diagram illustrating the motion of a vehicle if the cruise mode is switched from a manual cruise mode to an automated cruise mode when a transverse deviation has occurred.
Figure 5B:
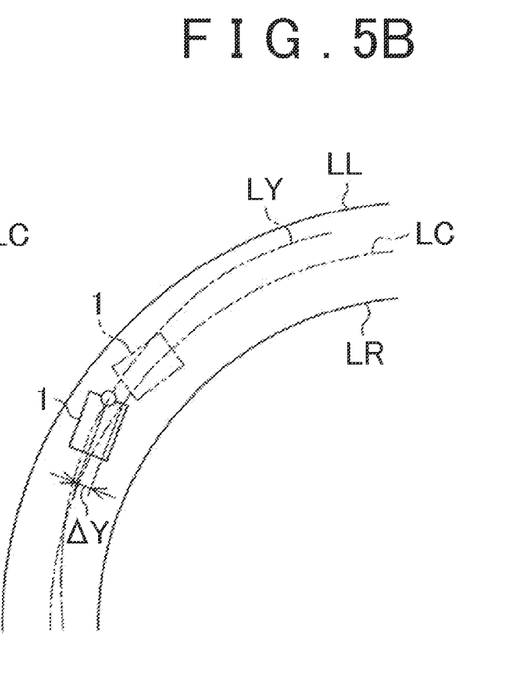
FIG. 5B is a motion diagram illustrating the motion of the vehicle if the cruise mode is switched from the manual cruise mode to the automated cruise mode when a transverse deviation that is smaller than that in FIG. 5A has occurred.

With reference to FIG. 4, FIG. 5A and FIG. 5B, the operation of the control apparatus 80 will be described. As illustrated in FIG. 4, when the travelling path curvature radius RA of the travelling path LY of the vehicle 1 does not coincide with the lane curvature radius RB of the center line LC of the lane, if the cruise mode is switched from the manual cruise mode to the automated cruise mode, the vehicle 1 is steered toward the center line LC as indicated by a two-dot chain line in FIG. 4.

When the absolute value of the curvature radius difference DR is large, the steered angle of the vehicle 1 may be changed by a large amount under the automated cruise control. Hence, if the automated cruise control is started when the absolute value of the curvature radius difference DR is large, there is a possibility that the vehicle 1 will exhibit unstable behavior after the automated cruise is started. This may give the driver uncomfortable feeling. When the steered angle is abruptly changed, there is a possibility that the vehicle 1 will cross the center line LC to approach a position close to the lane mark LR, LL (right lane mark LR in the example illustrated in FIG. 4). This may give the driver a sense of anxiety.

The control apparatus 80 does not start the automated cruise control when the absolute value of the curvature radius difference DR is larger than the curvature radius difference threshold DX. Thus, it is possible to reduce the frequency with which the automated cruise control is started in the state where there is a possibility that the vehicle 1 will exhibit unstable behavior after the automated cruise is started. As a result, the vehicle 1 is less likely to exhibit unstable behavior when travelling under the automated cruise control.

On the other hand, when the steering apparatus 10 changes the steered angle of the vehicle 1 that is travelling under the automated cruise control, the behavior exhibited by the vehicle 1 varies depending on the transverse deviation ΔY even if the absolute value of the curvature radius difference DR is the same. As indicated by a continuous line in FIG. 5A, when a transverse deviation ΔY of the vehicle 1 occurs, that is, when the vehicle transverse center is deviated from the center line LC, if the cruise mode is switched from the manual cruise mode to the automated cruise mode, the control apparatus 80 steers the vehicle 1 such that the transverse deviation ΔY is reduced as indicated by a two-dot chain line in FIG. 5A after the cruise mode is switched to the automated cruise mode.

As indicated by a continuous line in FIG. 5B, when a transverse deviation ΔY of the vehicle 1, which is smaller than the transverse deviation ΔY illustrated in FIG. 5A, occurs, if the cruise mode is switched from the manual cruise mode to the automated cruise mode, the control apparatus 80 steers the vehicle 1 such that the transverse deviation ΔY is reduced as indicated by a two-dot chain line in FIG. 5B after the cruise mode is switched to the automated cruise mode. In this case, the amount by which the steered angle needs to be changed to make the vehicle transverse center of the vehicle 1 coincide with the center line LC is smaller than the amount of change in the steered angle in the case illustrated in FIG. 5A. That is, the vehicle travelling under the automated cruise control is more likely to exhibit unstable behavior when the steering angle is changed by the steering apparatus 10, as the transverse deviation ΔY is larger. The control apparatus 80 sets the curvature radius difference threshold DX based on the transverse deviation ΔY. Thus, the behavior of the vehicle 1 is controlled more appropriately and the vehicle 1 is further less likely to exhibit unstable behavior when travelling under the automated cruise, than in the case where the curvature radius difference threshold DX is set as a constant value.

Even if the absolute value of the curvature radius difference DR is the same, when the transverse deviation ΔY is small, the possibility that the steered angle will be abruptly changed is low. Therefore, even if the absolute value of the curvature radius difference DR is the same, when the transverse deviation ΔY is small, the control apparatus 80 is more likely to start the automated cruise control. As a result, it is possible both to reduce the frequency with which the steered angle is abruptly changed and to restrict a decrease in the opportunity to switch the cruise mode to the automated cruise mode, as compared with the case where the curvature radius difference threshold DX is set as a constant value.

The control apparatus 80 according to the present embodiment produces the following advantageous effects. The control apparatus 80 sets the curvature radius difference threshold DX based on the transverse deviation ΔY. Thus, when the transverse deviation ΔY is large, the curvature radius difference threshold DX is set to a value smaller than that when the transverse deviation ΔY is small. Hence, the determination that the absolute value of the curvature radius difference DR is larger than the curvature radius difference threshold DX is more likely to be made. When the transverse deviation ΔY is large, the automated cruise control is less likely to be started. The vehicle 1 is further less likely to exhibit unstable behavior when travelling under the automated cruise control.

A control apparatus 80 according to a second embodiment of the invention is the same as the control apparatus 80 according to the first embodiment except for the following configurations. The difference is that, in the starting determination control, the curvature radius difference threshold DX is computed based on a yaw angle Φ in place of the transverse deviation ΔY. In the following description, the configurations of the control apparatus 80 in the second embodiment as those in the first embodiment will be denoted by the same reference symbols as those in the first embodiment.

With reference to FIG. 3, the process of the starting determination control executed by the control apparatus 80 will be described. In step S15, the control apparatus 80 computes an angle of the axis line X of the vehicle 1 relative to the direction of the lane (hereinafter, referred to as "yaw angle Φ") as the vehicle information.

In step S16, the control apparatus 80 computes the curvature radius difference threshold DX. The curvature radius difference threshold DX is set based on the yaw angle Φ. The curvature radius difference threshold DX becomes smaller as the absolute value of the yaw angle Φ becomes larger, and becomes larger as the absolute value of the yaw angle Φ becomes smaller.

Figure 6:
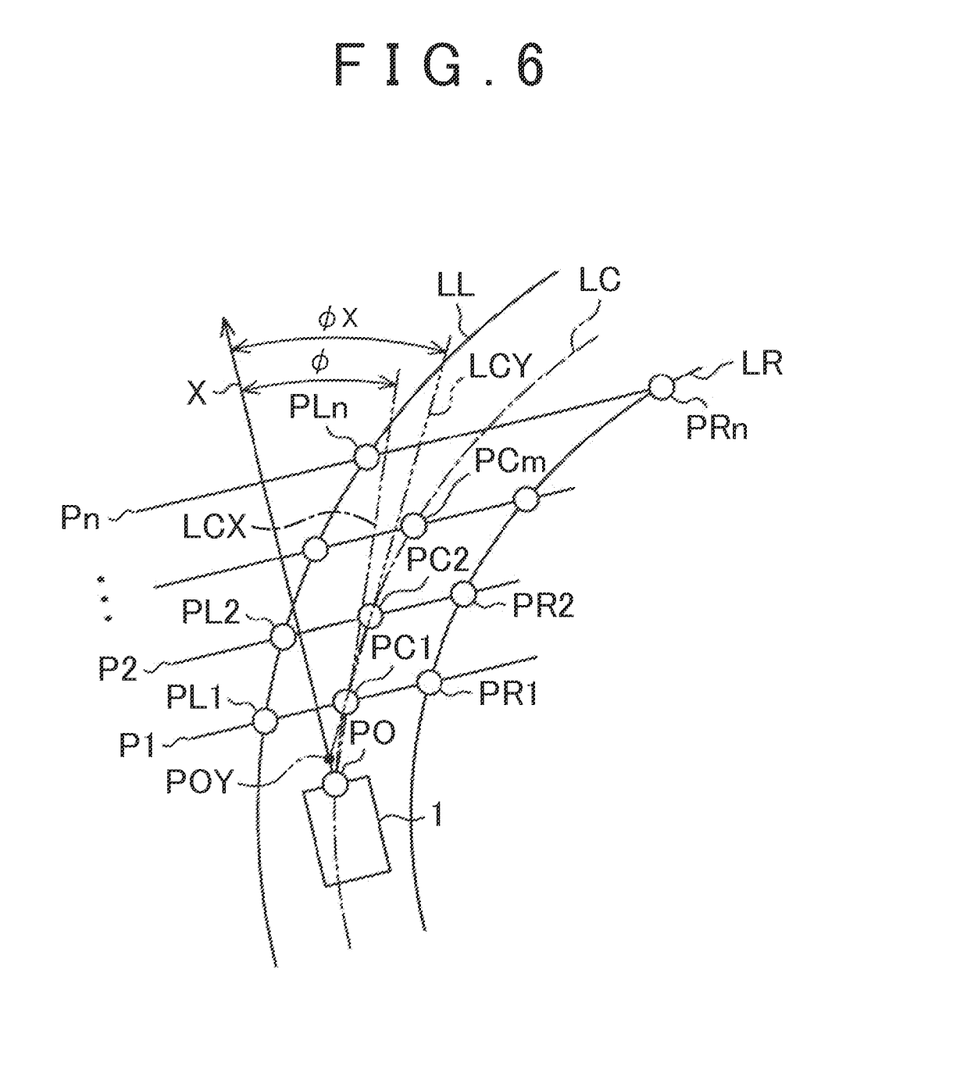
FIG. 6 is a schematic diagram illustrating a method of computing a yaw angle in a second embodiment of the invention.

With reference to FIG. 6, an example of a method of computing the yaw angle Φ will be described. The axis line X of the vehicle 1 illustrated in FIG. 6 is deviated by a prescribed angle relative to a straight line LCX connecting the origin position PO to the center position PC1. The control apparatus 80 computes an angle formed between the axis line X and the straight line LCX as the yaw angle Φ, using a trigonometric function. When the lane ahead of the vehicle 1 is curved, the computed yaw angle Φ differs from the actual yaw angle Φ. Hence, the yaw angle Φ may be corrected based on the lane curvature radius RB.

Figure 7A:
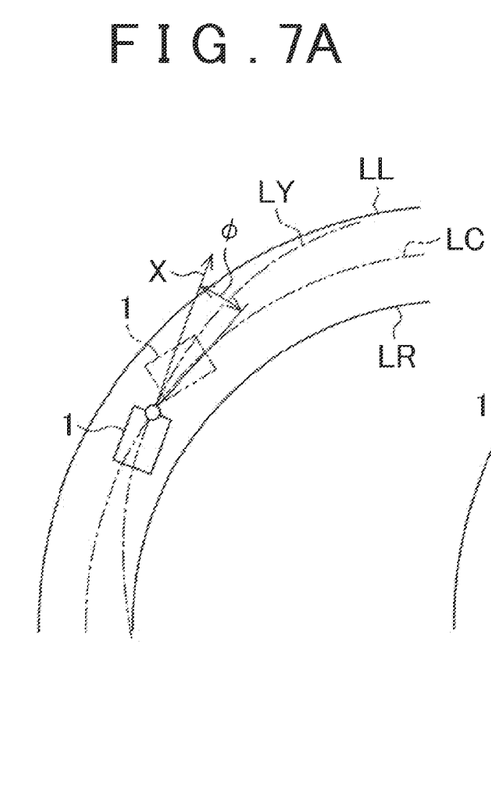
FIG. 7A is a motion diagram illustrating the motion of the vehicle if the cruise mode is switched from the manual cruise mode to the automated cruise mode when a yaw angle is formed.
Figure 7B:
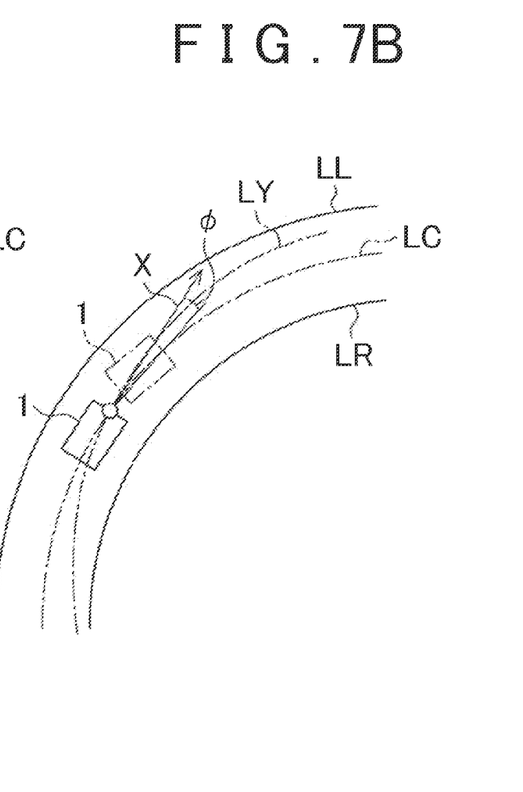
FIG. 7B is a motion diagram illustrating the motion of the vehicle if the cruise mode is switched from the manual cruise mode to the automated cruise mode when a yaw angle that is smaller than that in FIG. 7A is formed.

With reference to FIG. 7A and FIG. 7B, the operation of the control apparatus 80 will be described. When the steering apparatus 10 changes the steered angle of the vehicle 1 that is travelling under the automated cruise control, the behavior exhibited by the vehicle 1 varies depending on the yaw angle Φ even if the absolute value of the curvature radius difference DR is the same.

As indicated by a continuous line in FIG. 7A, when a yaw angle Φ of the vehicle 1 is formed, that is, when the axis line X is deviated from the center line LC, if the cruise mode is switched from the manual cruise mode to the automated cruise mode, the control apparatus 80 steers the vehicle 1 such that the yaw angle Φ is reduced as indicated by a two-dot chain line in FIG. 7A after the cruise mode is switched to the automated cruise mode.

As indicated by a continuous line in FIG. 7B, when a yaw angle Φ of the vehicle 1, which is smaller than the yaw angle Φ illustrated in FIG. 7A, is formed, if the cruise mode is switched from the manual cruise mode to the automated cruise mode, the control apparatus 80 steers the vehicle 1 such that the yaw angle Φ is reduced as indicated by a two-dot chain line in FIG. 7B after the cruise mode is switched to the automated cruise mode. In this case, the amount by which the steered angle needs to be changed to make the vehicle transverse center of the vehicle 1 coincide with the center line LC is smaller than the amount of change in the steered angle in the case illustrated in FIG. 7A. That is, the vehicle travelling under the automated cruise control is more likely to exhibit unstable behavior when the steering angle is changed by the steering apparatus 10, as the yaw angle Φ is larger. The control apparatus 80 sets the curvature radius difference threshold DX based on the yaw angle Φ. Thus, the behavior of the vehicle 1 is controlled more appropriately and the vehicle 1 is further less likely to exhibit unstable behavior when travelling under the automated cruise, than in the case where the curvature radius difference threshold DX is set as a constant value.

Even if the absolute value of the curvature radius difference DR is the same, when the yaw angle Φ is small, the possibility that the steered angle will be abruptly changed is low. Therefore, even if the absolute value of the curvature radius difference DR is the same, when the yaw angle Φ is small, the control apparatus 80 is more likely to start the automated cruise control. As a result, it is possible both to reduce the frequency with which the steered angle is abruptly changed and to restrict a decrease in the opportunity to switch the cruise mode to the automated cruise mode, as compared with the case where the curvature radius difference threshold DX is set as a constant value.

The control apparatus 80 according to the present embodiment produces the following advantageous effects. The control apparatus 80 sets the curvature radius difference threshold DX based on the yaw angle Φ. Thus, when the yaw angle Φ is large, the curvature radius difference threshold DX is set to a value smaller than that when the yaw angle Φ is small. Hence, the determination that the absolute value of the curvature radius difference DR is larger than the curvature radius difference threshold DX is more likely to be made. When the yaw angle Φ is large, the automated cruise control is less likely to be started. The vehicle 1 is further less likely to exhibit unstable behavior when travelling under the automated cruise control.

A control apparatus 80 according to a third embodiment of the invention is the same as the control apparatus 80 according to the first embodiment except for the following configurations. The difference is that, in the starting determination control, whether the automated cruise is to be started is determined based on the transverse deviation ΔY. In the following description, the configurations of the control apparatus 80 in the third embodiment as those in the first embodiment will be denoted by the same reference symbols as those in the first embodiment.

Figure 8:
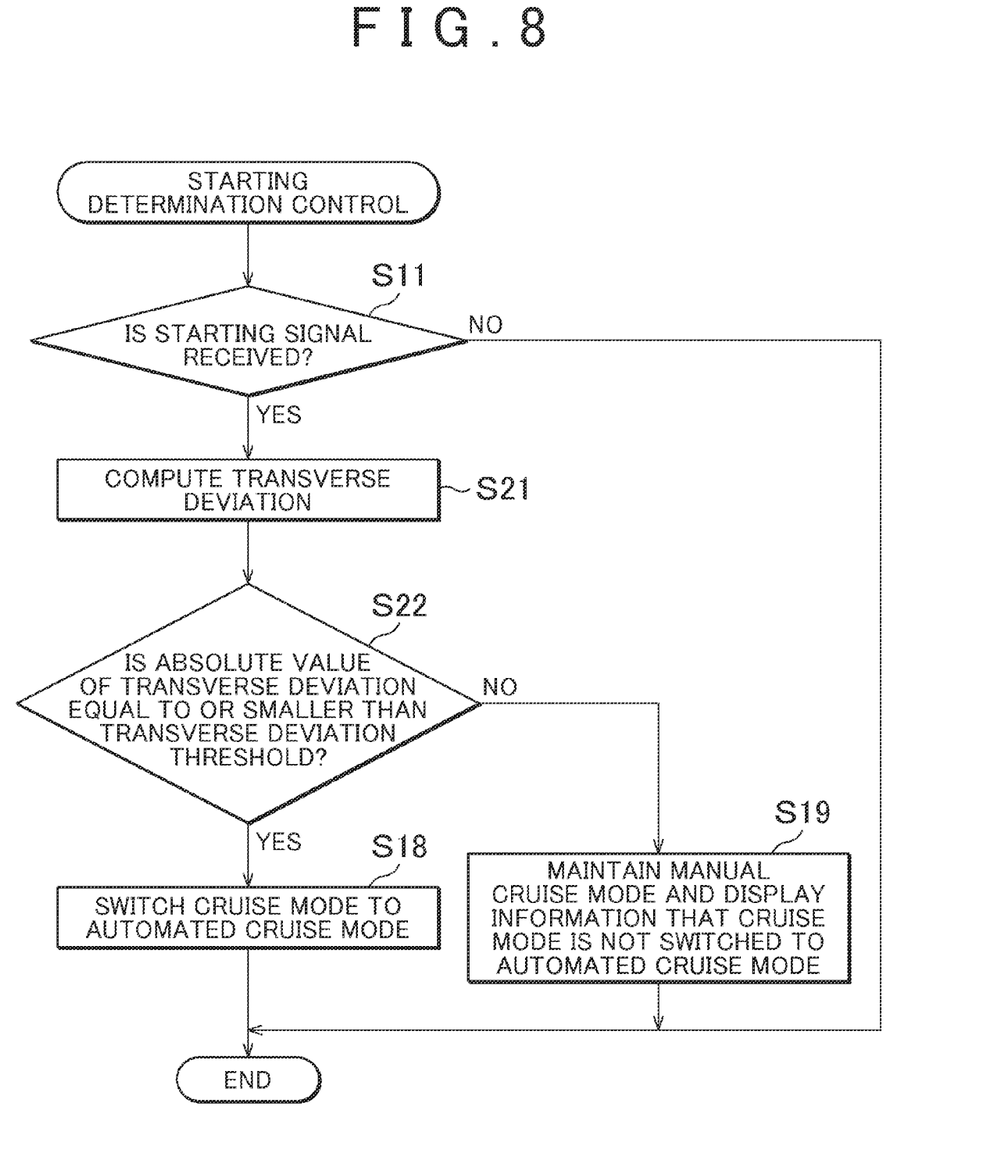
FIG. 8 is a flowchart illustrating the process of starting determination control that is executed by a control apparatus according to a third embodiment of the invention.

With reference to FIG. 8, the process of the starting determination control executed by the control apparatus 80 will be described below. When an affirmative determination is made in step S11, the control apparatus 80 proceeds on to step S21. In step S21, the control apparatus 80 computes the transverse deviation ΔY.

In step S22, the control apparatus 80 determines whether the transverse deviation ΔY is equal to or smaller than a transverse deviation threshold ΔYA. When an affirmative determination is made in step S22, the control apparatus 80 switches the cruise mode to the automated cruise mode in step S18.

On the other hand, when a negative determination is made in step S22, the control apparatus 80 maintains the manual cruise mode and displays the information that the cruise mode is not switched to the automated cruise mode on the display unit 20 in step S19. Then, the control apparatus 80 ends the process. That is, when the transverse deviation ΔY is larger than the transverse deviation threshold ΔYA, the automated cruise is not started.

The operation of the control apparatus 80 will be described below. As illustrated in FIG. 5A and FIG. 5B, the amount by which the steered angle needs to be changed to make the vehicle transverse center of the vehicle 1 coincide with the center line LC after the cruise mode is switched from the manual cruise mode to the automated cruise mode varies depending on the transverse deviation ΔY. Thus, the possibility that the steered angle will be abruptly changed is higher as the transverse deviation ΔY is larger.

The control apparatus 80 determines whether the cruise mode is to be switched to the automated cruise mode based on the transverse deviation ΔY, that is, the control apparatus 80 does not switch the cruise mode to the automated cruise mode when the transverse deviation ΔY is large. As a result, it is possible both to reduce the frequency with which the steered angle is abruptly changed and to reduce the frequency with which the vehicle 1 travels at a position close to the lane mark LR, LL.

The control apparatus 80 according to the present embodiment produces the following advantageous effects. When the absolute value of the transverse deviation ΔY is large, there is a possibility that the steered angle of the vehicle 1 will be changed by a large amount under the automated cruise control. Hence, if the automated cruise control is started when the absolute value of the transverse deviation ΔY is large, there is a possibility that the vehicle 1 will exhibit unstable behavior after the automated cruise is started. The control apparatus 80 does not start the automated cruise control when the absolute value of the transverse deviation ΔY is larger than the transverse deviation threshold ΔYA. Thus, it is possible to reduce the frequency with which the automated cruise control is started in the state where there is a possibility that the vehicle 1 will exhibit unstable behavior after the automated cruise is started. As a result, the vehicle 1 is less likely to exhibit unstable behavior when travelling under the automated cruise control.

A control apparatus 80 according to a fourth embodiment of the invention is the same as the control apparatus 80 according to the first embodiment except for the following configurations. The difference is that, in the starting determination control, whether the automated cruise is to be started is determined based on the yaw angle q). In the following description, the configurations of the control apparatus 80 in the fourth embodiment as those in the first embodiment will be denoted by the same reference symbols as those in the first embodiment.

Figure 9:
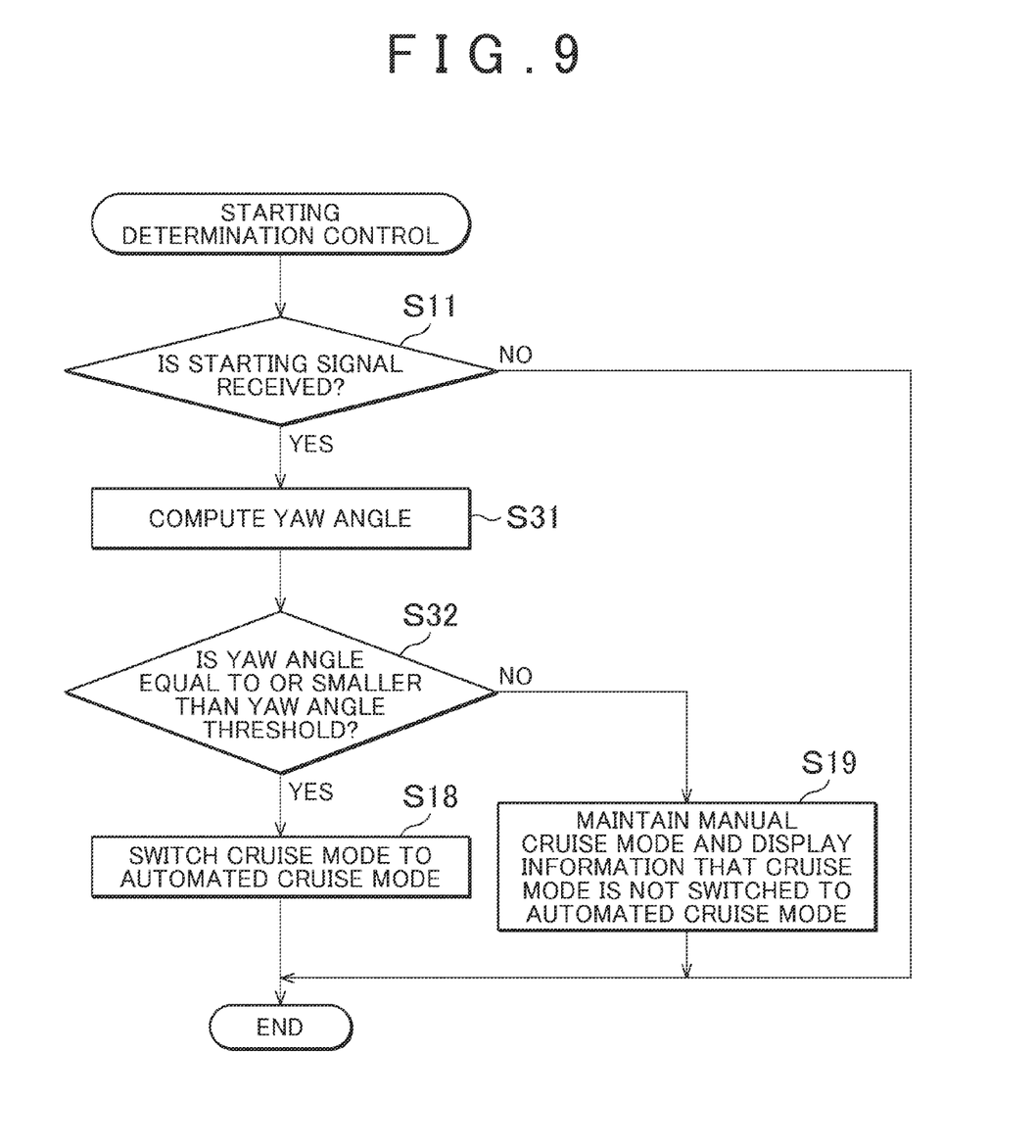
FIG. 9 is a flowchart illustrating the process of starting determination control that is executed by a control apparatus according to a fourth embodiment of the invention.

With reference to FIG. 9, the process of the starting determination control executed by the control apparatus 80 will be described below. When an affirmative determination is made in step S11, the control apparatus 80 proceeds on to step S31. In step S31, the control apparatus 80 computes the yaw angle Φ.

In step S32, the control apparatus 80 determines whether the absolute value of the yaw angle Φ is equal to or smaller than a yaw angle threshold ΦA. When an affirmative determination is made in step S32, the control apparatus 80 switches the cruise mode to the automated cruise mode in step S18.

When a negative determination is made in step S32, the control apparatus 80 maintains the manual cruise mode and displays the information that the cruise mode is not switched to the automated cruise mode on the display unit 20 in step S19. Then, the control apparatus 80 ends the process. That is, when the absolute value of the yaw angle Φ is larger than the yaw angle threshold ΦA, the automated cruise is not started.

The operation of the control apparatus 80 will be described below. As illustrated in FIG. 7A and FIG. 7B, the amount by which the steered angle needs to be changed to make the vehicle transverse center of the vehicle 1 coincide with the center line LC after the cruise mode is switched from the manual cruise mode to the automated cruise mode varies depending on the yaw angle Φ. Thus, the possibility that the steered angle will be abruptly changed is higher as the absolute value of the yaw angle Φ is larger.

The control apparatus 80 determines whether the cruise mode is to be switched to the automated cruise mode based on the yaw angle Φ, that is, the control apparatus 80 does not switch the cruise mode to the automated cruise mode when the yaw angle Φ is large. As a result, it is possible both to reduce the frequency with which the steered angle is abruptly changed and to reduce the frequency with which the vehicle 1 travels at a position close to the lane mark LR, LL.

The control apparatus 80 according to the present embodiment produces the following advantageous effects. When the absolute value of the yaw angle Φ is large, there is a possibility that the steered angle of the vehicle 1 will be changed by a large amount under the automated cruise control. Hence, if the automated cruise control is started when the absolute value of the yaw angle Φ is large, there is a possibility that the vehicle 1 will exhibit unstable behavior after the automated cruise is started. The control apparatus 80 does not start the automated cruise control when the absolute value of the yaw angle Φ is larger than the yaw angle threshold ΦA. Thus, it is possible to reduce the frequency with which the automated cruise control is started in the state where there is a possibility that the vehicle 1 will exhibit unstable behavior after the automated cruise is started. As a result, the vehicle 1 is less likely to exhibit unstable behavior when travelling under the automated cruise control.

The vehicle control apparatus according to the invention may be implemented in various other embodiments than the above-described embodiments. Hereinafter, modified examples of the above-described embodiments will be described as the other embodiments of the vehicle control apparatus according to the invention.

The curvature radius difference threshold DX in each of the first and second embodiments may be set based on the vehicle speed V. When the steered angle is changed after the cruise mode is switched from the manual cruise mode to the automated cruise mode, as the vehicle speed V is higher, there is a higher possibility that the vehicle 1 will cross the center line LC to approach the lane mark LR or LL on the opposite side. Therefore, the curvature radius difference threshold DX is set smaller as the vehicle speed V is higher. Thus, the vehicle 1 is less likely to exhibit unstable behavior when travelling under the automated cruise control. The vehicle speed V in this modified example is an example of the vehicle information. The curvature radius difference threshold DX may be set based on two or three of the transverse deviation ΔY, the yaw angle Φ and the vehicle speed V.

In each of the first and second embodiments, the travelling path curvature radius RA may be replaced with a travelling path curvature and the lane curvature radius RB may be replaced with a lane curvature. The curvature is inversely proportional to the curvature radius. Hence, the control apparatus 80 computes the curvatures by computing the reciprocals of the curvature radii RA, RB.

In each of the first and second embodiments, the positive or negative sign may be applied to the lane curvature radius RB based on the positive or negative sign of the constant "a" in Expression (2) that is an approximate expression. Specifically, the sign of the travelling path curvature radius RA when the vehicle 1 turns to the right is made to coincide with the sign of the lane curvature radius RB when the constant "a" is a positive value. Similarly, the sign of the travelling path curvature radius RA when the vehicle 1 turns to the left is made to coincide with the sign of the lane curvature radius RB when the constant "a" is a negative value. In is modified example, the direction in which the vehicle 1 turns and the direction of the curve of the lane are taken into account in computing the curvature radius difference DR. When the direction in which the vehicle 1 turns differs form the direction of the curve of the lane, the absolute value of the curvature radius difference DR is larger than that in the case where the direction in which the vehicle 1 turns coincides with the direction of the curve of the lane. As a result, the vehicle 1 is less likely to exhibit unstable behavior when travelling under the automated cruise control.

In each of the first and second embodiments, step S14 and step S17 in the starting determination control may be modified as follows. When the absolute value of the travelling path curvature radius RA satisfies Expression (4) below, the control apparatus 80 proceeds on to step S18 as the curvature radius difference is smaller than the curvature radius difference threshold. On the other hand, when the absolute value of the travelling path curvature radius RA does not satisfy Expression (4) below, the control apparatus 80 proceeds on to step S19 as the curvature radius difference is equal to or larger than the curvature radius difference threshold.

$$DXA \cdot RB < |RA| < DXB \cdot RB \qquad (4)$$

DXA indicates a value smaller than "one", and is changed to be smaller as the absolute value of the transverse deviation ΔY or the yaw angle Φ computed in step S15 is larger. DXB indicates a value larger than "one", and is changed to be smaller as the absolute value of the transverse deviation ΔY or the yaw angle Φ computed in step S15 is larger.

The vehicle 1 in each of the first and third embodiments may be provided with a transverse deviation detector. In this case, the control apparatus 80 may compute the transverse deviation ΔY based on an output from the transverse deviation detector. As the transverse deviation detector, a detector that detects a magnetic force of a magnetic marker attached to the lane transverse center may be used. Alternatively, a transverse deviation computing unit using the GPS may be used. That is, any configurations may be adopted as long as it is possible to compute the deviation between the vehicle transverse center and the lane transverse center.

The vehicle 1 in each of the second and fourth embodiments may be provided with a yaw angle detector. In this case, the control apparatus 80 may compute the yaw angle Φ based on an output from the yaw angle detector. The yaw angle detector may be a yaw angle computing unit using the GPS. That is, any configurations may be adopted as long as it is possible to compute the deviation angle between the axis line X of the vehicle 1 and the direction of the lane.

The control apparatus 80 in each of the second and fourth embodiments may execute the starting determination control based on a yaw angle ΦX at the front positions P1 to Pn in place of the yaw angle Φ. For example, the control apparatus 80 extends a straight line LCY, which connects the center position PC1 to the center position PC2 as illustrated in FIG. 6, toward the vehicle 1. Next, the control apparatus 80 computes an angle formed between the axis line X and the straight line LCY as the yaw angle ΦX, using a trigonometric function, based on the position of an intersection POY between the straight line LCY and the axis line X, the distance from the intersection POY to the center position PC2, and the distance from the intersection POY to the front position P2. The yaw angle ΦX may be computed using the center positions PC2 to PCm located ahead of the center position PC1.

The control apparatus 80 in this modified example executes the starting determination control based on the yaw angle ΦX at the front positions P1 to Pn, that is, the difference between the present orientation of the vehicle 1 along the direction of the axis line X and the direction of the lane at the front positions P1 to Pn. Hence, for example, when the lane meanders at the front positions P1 to Pn, the automated cruise control is likely to be prohibited. As a result, the vehicle 1 is less likely to exhibit unstable behavior when travelling under the automated cruise control.

When the difference between the yaw angle Φ and the yaw angle ΦX is large, there is a possibility that the lane meanders largely. Thus, there is a possibility that the vehicle 1 will exhibit unstable behavior after the cruise control is switched to the automated cruise mode. Therefore, in the starting determination control, when the absolute value of the difference between the yaw angle Φ and the yaw angle ΦX is large, the manual cruise mode may be maintained without switching the cruise mode to the automated cruise mode. As a result, the vehicle 1 is less likely to exhibit unstable behavior when travelling under the automated cruise control.

The control in step S31 and step S32 in the fourth embodiment may be incorporated into the starting determination control in the third embodiment. The transverse deviation threshold ΔYA in the third embodiment may be set based on the vehicle speed V. For example, as the vehicle speed V is higher, the transverse deviation threshold ΔYA may be set smaller. As a result, the vehicle 1 is less likely to exhibit unstable behavior when travelling under the automated cruise control.

The yaw angle threshold ΦA in the fourth embodiment may be set based on the vehicle speed V. For example, as the vehicle speed V is higher, the yaw angle threshold ΦA may be set smaller. As a result, the vehicle 1 is less likely to exhibit unstable behavior when travelling under the automated cruise control.

The control apparatus 80 according to each of the embodiments above may compute the center positions PC1 to PCm based on only one of the right lane mark LR and the left lane mark LL. For example, the control apparatus 80 sets positions that are apart leftward by a prescribed distance (for example, half the width of the lane) from the right lane mark LR, as the center positions PC1 to PCm. That is, any configurations can be adopted as long as it is possible to estimate the center position PC1.

The following determination process may be incorporated into the starting determination control according to each of the embodiments above. That is, when it is determined that a prediction is made that the vehicle 1 will cross the center line LC to approach the lane mark LR or LL on the opposite side or a prediction is made that the vehicle 1 will be out of the lane after a prescribed period on the assumption that the cruise mode is switched to the automated cruise mode, the cruise mode is not switched to the automated cruise mode. The determination process is executed based on at least one of the curvature radius difference DR, the transverse deviation ΔY and the yaw angle Φ. The prescribed period may be changed based on the vehicle speed V.

The travelling path curvature radius RA in each of the embodiments above may be corrected based on the steered angle. The yaw rate co is influence by a side skid of the vehicle 1. Thus, the correction of the travelling path curvature radius RA based on the steered angle improves the accuracy of computation of the travelling path curvature radius RA.

A laser radar may be adopted in place of the CCD camera 60 in each of the embodiments above. The lane mark recognizing unit 70 computes the positional information on the lane marks LR, LL based on an output from the laser radar.

The vehicle 1 according to each of the embodiments above includes the display unit 20 that displays the information that the cruise mode is not switched to the automated cruise mode. However, the vehicle 1 may include a notification device that notifies the driver of the information that the cruise mode is not switched to the automated cruise mode by voice or by a warning sound, instead of or in addition to the display unit 20.

What is claimed is:

1. A vehicle control apparatus that controls a steering apparatus of a vehicle to make the vehicle to perform automated cruise, the apparatus comprising:
    a switching signal receiving unit that receives a signal from a switching device disposed in the vehicle, the switching device being a switch that switches a cruise mode between a manual cruise mode and an automated cruise mode;
    a vehicle information receiving unit that receives vehicle information that is information regarding travelling of the vehicle;
    a vehicle positional information receiving unit that receives vehicle positional information indicating a widthwise relative positional relationship between a lane in which the vehicle is travelling and the vehicle in the lane; and
    a steering control signal output unit that outputs a signal for controlling the steering apparatus of the vehicle,
    wherein the vehicle control apparatus starts making a determination as to whether the automated cruise mode or the manual cruise mode is to be selected as the cruise mode, in response to a switching signal input into the switching signal receiving unit,
    wherein the vehicle control apparatus makes the determination based on both or one of the vehicle information input into the vehicle information receiving unit and the vehicle positional information input into the vehicle positional information receiving unit, and
    wherein when it is determined that the automated cruised mode is to be selected as the cruise mode, the vehicle control apparatus starts the automated cruise control of the vehicle by switching the cruise mode to the automated cruise mode and outputting a steering control signal from the steering control signal output unit to start control of the steering apparatus.

2. The vehicle control apparatus according to claim 1, further comprising a vehicle mode signal output unit that outputs a signal indicating whether the vehicle control apparatus is in the automated cruise mode or in the manual cruise mode,
    wherein when the determination is completed, the vehicle control apparatus outputs a signal indicating the selected vehicle mode via the vehicle mode signal output unit.

3. The vehicle control apparatus according to claim 1, wherein:
    a curvature radius difference threshold used to determine whether the automated cruise mode or the manual cruise mode is to be selected as the cruise mode is set based on the vehicle information; and
    a determination that the manual cruise mode is to be selected instead of the automated cruise mode is made when an absolute value of a curvature radius difference that is a difference between a travelling path curvature radius and a lane curvature radius is larger than the curvature radius difference threshold, the travelling path curvature radius being a curvature radius of a travelling path of the vehicle and the lane curvature radius being a curvature radius of the lane in which the vehicle is travelling.

4. The vehicle control apparatus according to claim 3, wherein the vehicle information includes at least one of a yaw angle of the vehicle and a vehicle speed that is a travelling speed of the vehicle.

5. The vehicle control apparatus according to claim 1, wherein:
- an absolute value of a transverse deviation that is a difference between a transverse center of the lane and a transverse center of the vehicle is obtained based on the vehicle positional information input into the vehicle positional information receiving unit; and
- a determination that the manual cruise mode is to be selected instead of the automated cruise mode is made when the absolute value of the transverse deviation is larger than a prescribed transverse deviation threshold.

6. The vehicle control apparatus according to claim 1, wherein:
- the vehicle information includes a yaw angle of the vehicle; and
- a determination that the manual cruise mode is to be selected instead of the automated cruise mode is made when an absolute value of the yaw angle of the vehicle is larger than a prescribed yaw angle threshold.

7. A vehicle control method for executing automated control, the method comprising:
- controlling a steering apparatus to make the vehicle perform automated cruise;
- receiving a signal from a switching device disposed in the vehicle, the switching device being a switch that switches a cruise mode between a manual cruise mode and an automated cruise mode;
- receiving vehicle information that is information regarding travelling of the vehicle;
- receiving vehicle positional information indicating a widthwise relative positional relationship between a lane in which the vehicle is travelling and the vehicle in the lane;
- outputting a signal for controlling the steering apparatus of the vehicle; and
- automatically making a determination as to whether the automated cruise mode or the manual cruise mode is to be selected as the cruise mode, in response to a switching signal,
- wherein the determination is made based on both or one of the vehicle information and the vehicle positional information, and
- wherein when it is determined that the automated cruise mode is to be selected as the cruise mode, starting the automated cruise control of the vehicle by switching the cruise mode to the automated cruise mode and outputting a steering control to start control of the steering apparatus.

8. The vehicle control method according to claim 7, further comprising:
- setting a curvature radius difference threshold based on vehicle information that is information regarding travelling of the vehicle, the curvature radius difference threshold being used in a process for determining whether the automated cruise control is to be started; and
- determining whether an absolute value of a curvature radius difference that is a difference between a travelling path curvature radius and a lane curvature radius is larger than the curvature radius difference threshold, the travelling path curvature radius being a curvature radius of a travelling path of the vehicle and the lane curvature radius being a curvature radius of a lane in which the vehicle is travelling, wherein
- the automated cruise control is not started when the absolute value is larger than the curvature radius difference threshold.

9. The vehicle control method according to claim 8, wherein the vehicle information includes at least one of a transverse deviation, a yaw angle of the vehicle, and a vehicle speed that is a travelling speed of the vehicle, the transverse deviation being a difference between a lane transverse center that is a center position of the lane in a width direction of the lane and a vehicle transverse center that is a center position of the vehicle in a width direction of the vehicle.

10. The vehicle control method according to claim 7, further comprising:
- acquiring a lane transverse center that is a center position of a lane, in which the vehicle is travelling, in a width direction of the lane;
- acquiring a vehicle transverse center that is a center position of the vehicle in a width direction of the vehicle;
- obtaining an absolute value of a transverse deviation that is a difference between the lane transverse center and the vehicle transverse center; and
- determining whether the absolute value of the transverse deviation is larger than a prescribed transverse deviation threshold, wherein
- the automated cruise control is not started when the absolute value is larger than the prescribed transverse deviation threshold.

11. The vehicle control method according to claim 7, further comprising:
- acquiring a yaw angle of the vehicle; and
- determining whether an absolute value of the yaw angle of the vehicle is larger than a prescribed yaw angle threshold, wherein
- the automated cruise control is not started when the absolute value of the yaw angle of the vehicle is larger than the prescribed yaw angle threshold.

* * * * *